(12) United States Patent
Gupta (10) Patent No.: US 8,127,219 B1
(45) Date of Patent: Feb. 28, 2012

(54) PRINTING AND RENDERING HYPERLINK DESTINATIONS

(75) Inventor: Manoj Gupta, Dehradun (IN)

(73) Assignee: Adobe Systems Incorporated, San Jose, CA (US)

( * ) Notice: Subject to any disclaimer, the term of this patent is extended or adjusted under 35 U.S.C. 154(b) by 884 days.

(21) Appl. No.: 11/656,827

(22) Filed: Jan. 22, 2007

(51) Int. Cl.
*G06F 17/24* (2006.01)
*G06F 17/25* (2006.01)

(52) U.S. Cl. ........................................ 715/205; 715/208

(58) Field of Classification Search .................... 715/205
See application file for complete search history.

(56) References Cited

U.S. PATENT DOCUMENTS

| | | | |
|---|---|---|---|
| 5,680,613 A * | 10/1997 | Atsumi ................................. | 1/1 |
| 5,761,683 A | 6/1998 | Logan et al. | |
| 5,848,413 A * | 12/1998 | Wolff ................................... | 1/1 |
| 5,983,244 A | 11/1999 | Nation | |
| 5,987,482 A | 11/1999 | Bates et al. | |
| 6,029,182 A | 2/2000 | Nehab et al. | |
| 6,199,071 B1 * | 3/2001 | Nielsen ................................ | 1/1 |
| 6,434,561 B1 * | 8/2002 | Durst et al. ......................... | 1/1 |
| 6,537,324 B1 * | 3/2003 | Tabata et al. ................... | 715/205 |
| 6,694,043 B2 * | 2/2004 | Seder et al. ..................... | 382/100 |
| 6,940,491 B2 * | 9/2005 | Incertis Carro ............... | 345/173 |
| 7,050,192 B2 * | 5/2006 | Shima .......................... | 358/1.18 |
| 7,275,206 B1 | 9/2007 | Bates et al. | |
| 7,660,781 B2 | 2/2010 | Chau | |
| 2002/0069229 A1 | 6/2002 | Hailpern et al. | |
| 2002/0083093 A1 * | 6/2002 | Goodisman et al. .......... | 707/511 |
| 2004/0205497 A1 * | 10/2004 | Alexander et al. ......... | 715/501.1 |
| 2007/0156761 A1 | 7/2007 | Smith | |
| 2007/0177165 A1 | 8/2007 | Xie | |
| 2007/0182973 A1 | 8/2007 | Godley | |
| 2008/0229182 A1 * | 9/2008 | Hendricks et al. ............ | 715/205 |

OTHER PUBLICATIONS

Delort et al.,"Enhanced Web Document Summarization Using Hyperlinks", 2003, ACM, pp. 208-215.*
"Open Office: Documentation." accessed at <http://web.archive.org/web/20070117223237/http://documentation.openoffice.org/>. Available on-line Dec. 19, 2006. (pp. 1-2).
Adobe Systems Incorporated. "Adobe Pagemaker 7". accessed at <http://web.archive.org/web/20070121011041/http://www.adobe.com/products/pagemaker/>. Available on-line Jan. 21, 2007. (2 pages).
Microsoft Office Word 2003. Copyright 1983-2003. Screen Capture of Print Dialogue. (p. 1).
Adobe Acrobat 8 Professional. Copyright 1984-2007. Screen Capture of Print Dialogue. (p. 1).
U.S. Appl. No. 11/687,633, filed Mar. 17, 2007.

* cited by examiner

*Primary Examiner* — Doug Hutton, Jr.
*Assistant Examiner* — James Debrow
(74) *Attorney, Agent, or Firm* — Robert C. Kowert; Meyertons, Hood, Kivlin, Kowert & Goetzel, P.C.

(57) ABSTRACT

A method is provided. In this method, content comprises a hyperlink source and a hyperlink destination. The hyperlink destination is embedded within the hyperlink sources. The hyperlink destination is extracted from the content and the hyperlink destination is printed or rendered with the content.

25 Claims, 7 Drawing Sheets

PRINTING AND RENDERING HYPERLINK DESTINATIONS

FIELD OF THE INVENTION

The present invention relates generally to software and, more particularly, to printing and rendering hyperlink destinations.

BACKGROUND

Conventional documents, files, images, or other types of data may be viewed using various types of interfaces for applications such as Web browsers or networked applications that permit, for example, accessing and retrieving content from sources connected to the Internet. However, conventional techniques often are problematic. A given document, file, image, or other type of content may have one or more embedded hyperlink destinations that connect or link to other contents. However, when the document, file, image, or other content is printed, the hyperlink destinations do not appear and the content found at the link address or destination is neither printed nor retrieved.

Since the embedded hyperlink destinations are not printed with the content, information regarding the hyperlink destinations are lost in print. A user reading the printed content will therefore not be able to identify the hyperlink destinations that are embedded within the content. Instead, users are forced to navigate the series of hyperlinks to the other contents in order to view the contents and, if they choose, to retrieve and print the contents. This type of user interaction results in a poor quality user experience due to the disruption required of having to navigate links to access other contents, print the other contents once located, accessed, and retrieved from the hyperlinks, and, possibly, having to open another or different application in order to view or print the contents.

In view of the foregoing, there is a need for continuing efforts to improve the access of information and user experience regarding hyperlink destinations.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

The embodiments described herein provide methods and computing devices for printing and/or rendering hyperlink destinations. Content may include hyperlink sources and associated hyperlink destinations. In an embodiment, the hyperlink destinations are embedded in the hyperlink sources. When the content is printed or rendered, the hyperlink destinations are extracted from the content and, as explained in more detail below, printed or rendered with the content.

Figure 1:
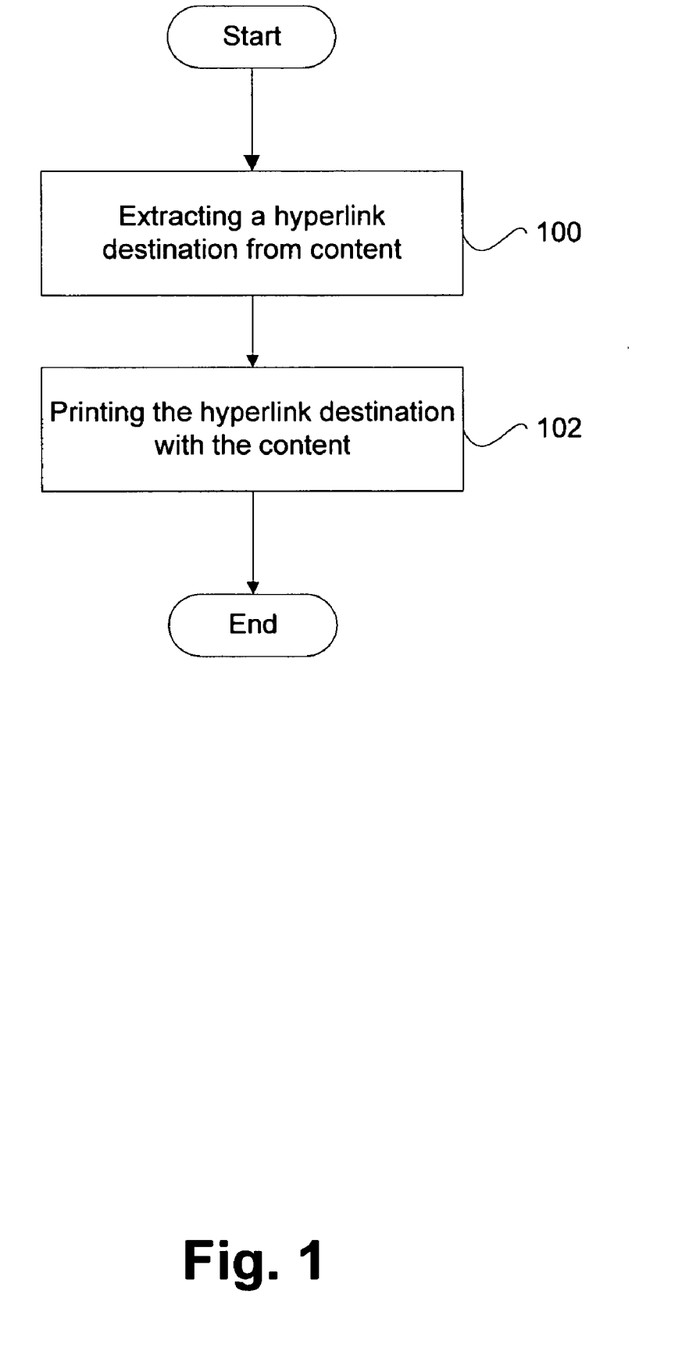
FIG. 1 is a flowchart diagram of a general overview for printing a hyperlink destination with content, in accordance with an embodiment.

FIG. 1 is a flowchart diagram of a general overview for printing a hyperlink destination with content, in accordance with an embodiment. Starting at 100, a hyperlink destination is extracted from content. Content can include a variety of data that includes one or more hyperlink sources and hyperlink destinations. Examples of contents include electronic documents, image files, and other data. It should be noted that an electronic document is a document existing in electronic form that is accessible by computer technology. For example, an electronic document can be a file that is not an executable file and includes data for use by a computer program. Electronic document can include single or multiple files that are accessible by and/or associated with electronic document processing applications such as word processing applications, document viewers, Web browsers, email applications, presentation applications, spreadsheet applications, diagramming applications, graphic editors, graphic viewers, enterprise applications, and other applications. Therefore, an electronic document may be composed of alphanumeric texts, symbols, images, videos, sounds, and other data. The file associated with an electronic document can be designed for portability. As a result, in an embodiment, a single file associated with the electronic document may encapsulate a complete description of the electronic document. In another embodiment, multiple files associated with an electronic document can encapsulate the description of the electronic document. An electronic document may have a variety of file formats, and the file formats may be identified by data within the electronic document and/or by the filename extension. Examples of file formats that can be associated with an electronic document include Adobe Portable Document Format (PDF), Microsoft DOC format, Hypertext Markup Language (HTML) format, Extensible Markup Language (XML) format, Microsoft XLS format, Tag Image File Format (TIFF), and other file formats that can be associated with the electronic document.

Content includes both hyperlink sources and hyperlink destinations. A hyperlink destination can be a reference within the content to another portion of the same content, to another content, or to a specified portion of another content. An example of a hyperlink destination is a Uniform Resource Locator (URL). The URL refers to or addresses data on the Internet. Examples of data include HyperText Markup Language (HTML) documents, image files, video files, and other resources. In general, a URL is a string of characters conforming to a standardized format that refers to data on the Internet by their location. For example, a URL may include the data's name (e.g., file name) preceded by a hierarchy of directory names in which the data are stored. An example of a URL is "http://www.adobe.com/products/breeze/index.html."

A hyperlink source can be an area within the content that is associated with the hyperlink destination. The hyperlink source may, for example, include words, images, alphanumeric texts, or other data associated with the content. To differentiate the hyperlink source from other data within the content, the hyperlink source may be displayed differently from the other data. For example, a Web browser can display the hyperlink source in a different color from the other data displayed within the Web browser. Alternatively, the hyperlink source may be displayed in a different font and style (e.g., underlined, bold, italic, and other styles).

It should be appreciated that a hyperlink destination may be associated or attached to one or more hyperlink sources. The hyperlink destination also may be embedded in a hyperlink source. When a user activates the hyperlink source (e.g., by selecting the hyperlink with a mouse or keyboard), another program application may be launched to open the content located at the hyperlink destination. In other words, the activation of a hyperlink source can trigger a program application to retrieve or access the content located at a hyperlink destination that is associated with the hyperlink source.

Still referring to FIG. 1, after the hyperlink destination is extracted, the hyperlink destination is printed with the content at 102. The hyperlink destination is printed together with the content such that both the content and the hyperlink destination are visible in print. As will be explained in more detail below, in one embodiment, a hyperlink destination may be printed in brackets following a hyperlink source. In another embodiment, the hyperlink destinations are printed or provided at the end of the content.

Figure 2:
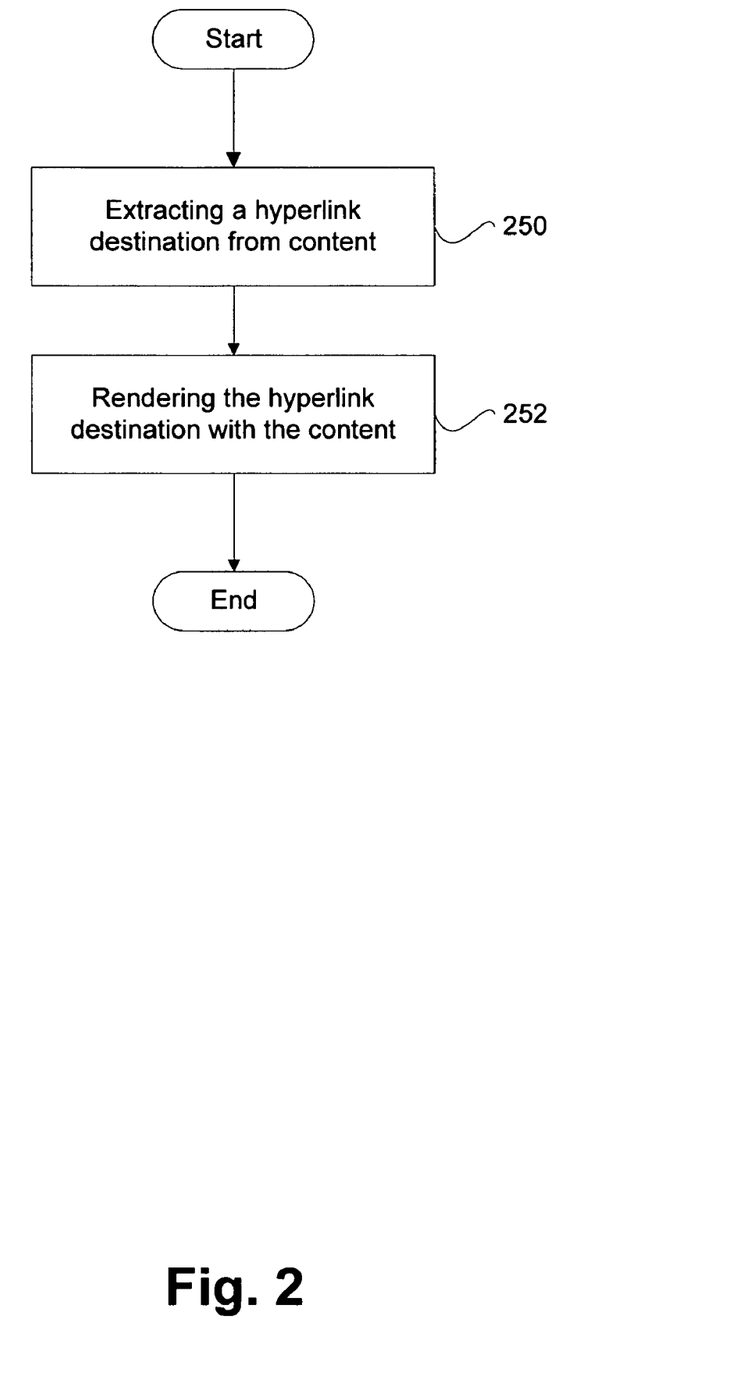
FIG. 2 is a flowchart diagram of a general overview for rendering a hyperlink destination with content, in accordance with an embodiment.

FIG. 2 is a flowchart diagram of a general overview for rendering a hyperlink destination with content, in accordance with an embodiment. Starting at 250, a hyperlink destination is extracted from content. In an embodiment, the hyperlink destination may be rendered with the content on a display at 252. The hyperlink destination and the content are rendered on a display such that the rendering simulates a printed output of the hyperlink destination with the content. In other words, the rendering imitates the appearance of the hyperlink destination with the content when printed. Such rendering can be displayed, for example, in a print preview. In another example, the hyperlink destination and the content may be displayed or provided in an electronic document such as to simulate the printed output.

Figure 3:
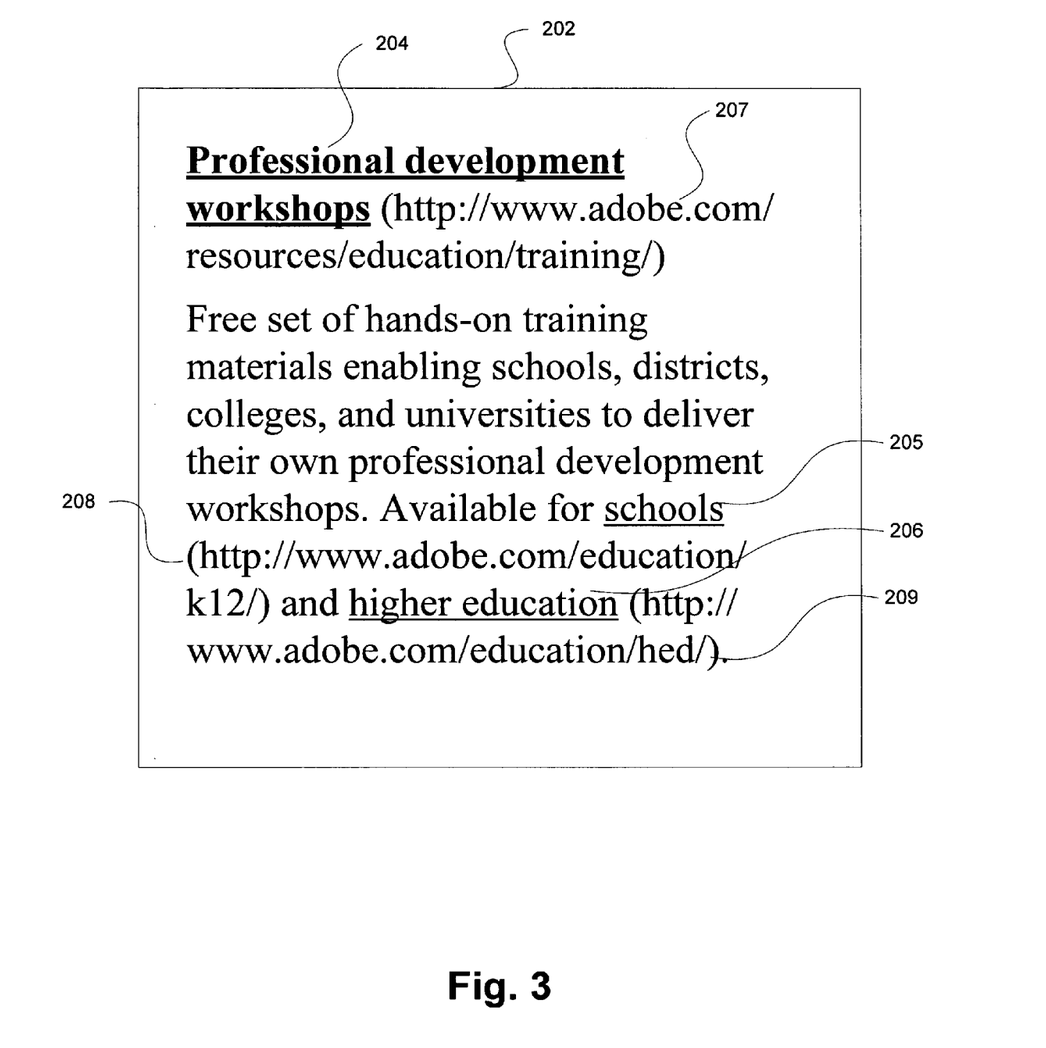
FIG. 3 is a diagram of a printed or rendered electronic document, in accordance with an embodiment.

FIG. 3 is a diagram of a printed or rendered electronic document, in accordance with an embodiment. Electronic document 202 includes hyperlink sources 204-206 and hyperlink destinations 207-209. In an embodiment, electronic document 202 is a publication of an electronic document in print. In another embodiment, electronic document 202 is a rendering of an electronic document on a display. As shown in FIG. 3, hyperlink destinations 207-209 are visible within electronic document 202. Each hyperlink destination 207, 208, or 209 is enclosed in brackets and is printed or rendered to one side of its associated hyperlink source 204, 205, or 206. In FIG. 3, each hyperlink destination 207, 208, or 209 is printed or rendered following its hyperlink source 204, 205, or 206. Here, hyperlink destination 207 is attached to hyperlink source 204, hyperlink destination 208 is attached to hyperlink source 205, and hyperlink destination 209 is attached to hyperlink source 206. As such, hyperlink destination 207 follows hyperlink source 204, hyperlink destination 208 follows hyperlink source 205, and hyperlink destination 209 follows hyperlink source 206.

Hyperlink destinations 209 are enclosed within brackets in order to distinguish the hyperlink destinations from other data (e.g., hyperlink sources 204-206, texts, and other data) displayed in electronic document 202. However, it should be noted that hyperlink destinations 209 may be displayed differently from other data in a variety of other different techniques. For example, hyperlink destinations 207-209 can be printed or rendered in a different color from the other data included in electronic document 202. Alternatively, hyperlink destinations 207-209 can be enclosed within other alphanumeric characters (e.g., { }, [ ], " ", ' ', and other characters) and/or symbols (e.g., $, *, ▼, ¤, ♥, and other symbols). In another example, hyperlink destinations 207-209 can be printed or rendered in different fonts and/or styles (e.g., underlined, bold, italic, and other styles), shading, and/or patterns (e.g., solid, hatch, stripes, dots, and other patterns).

Figure 4:
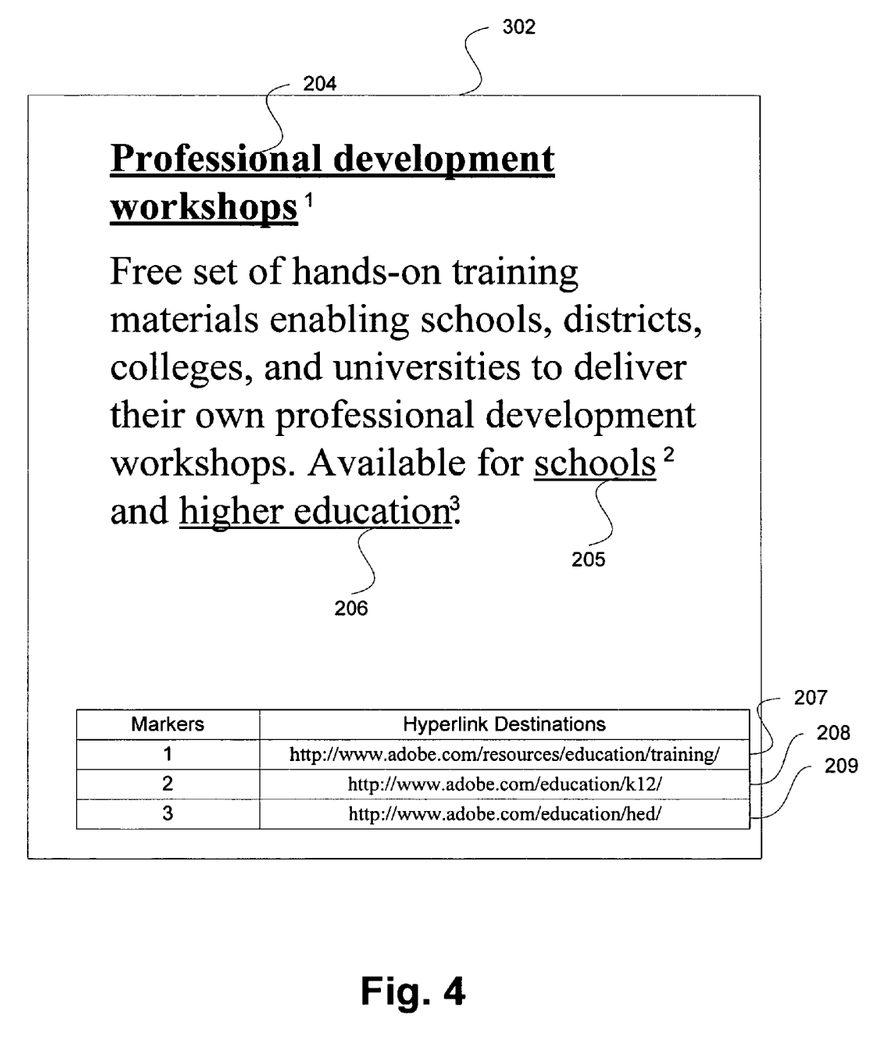
FIG. 4 is a diagram of another printed or rendered electronic document, in accordance with another embodiment.

FIG. 4 is a diagram of another printed or rendered electronic document, in accordance with another embodiment. Electronic document 302 includes hyperlink sources 204-206 and hyperlink destinations 207-209. In this embodiment, hyperlink destinations 207-209 are grouped together and located at the end of electronic document 302. Attached to each hyperlink source 204, 205, or 206 and each hyperlink destination 207, 208, or 209 is marker 1, 2, or 3. Since hyperlink destinations 207-209 are printed or rendered separate from hyperlink sources 204-206, markers 1, 2, and 3 identify the association of the hyperlink sources 204-206 with their corresponding hyperlink destinations 207-209. In other words, each marker 1, 2, or 3 is configured to identify that a hyperlink destination 207, 208, or 209 corresponds to a hyperlink source 204, 205, or 206. In regard to hyperlink sources 204-206, markers 1-3 are printed or rendered as superscripts. Each marker 1, 2, or 3 is printed or rendered to one side of its corresponding hyperlink source 204, 205, or 206 and indicates or identifies its hyperlink destination 207, 208, or 209.

To incorporate markers 1-3 in electronic document 302, the markers are generated. Each marker 1, 2, or 3 is associated with a hyperlink source 204, 205, or 206 and its corresponding hyperlink destination 207, 208, or 209. In other words, each marker 1, 2, or 3 is assigned to a hyperlink source 204, 205, or 206 and its attached hyperlink destination 207, 208, or 209. For example, hyperlink destination 207 corresponds to hyperlink source 204. As such, both hyperlink destination 207 and hyperlink source 204 are associated with marker 1. In another example, hyperlink destination 208 corresponds to hyperlink source 205. As a result, both hyperlink destination 208 and hyperlink source 205 are associated with marker 2. After the association, markers 1-3 are printed or rendered with the hyperlink sources 204-206 and hyperlink destinations 207-209, as shown in FIG. 4. Markers 1-3 associated with the hyperlink sources 204-206 point to their corresponding hyperlink destinations 207-209. With markers 1-3, a user reading electronic document 302 can therefore identify each hyperlink destination 207, 208, or 209 that corresponds to each hyperlink source 204, 205, or 206.

Figure 5:
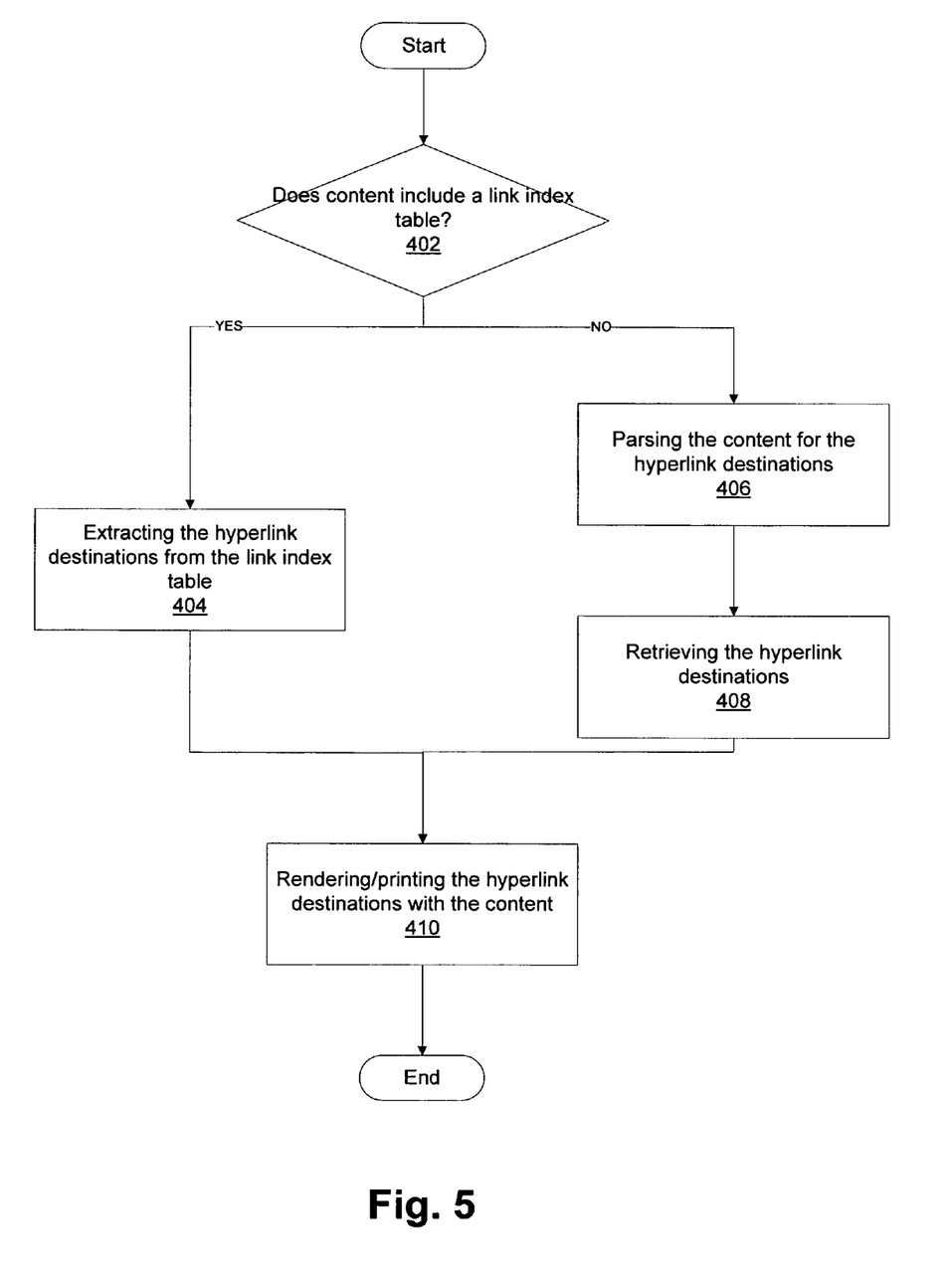
FIG. 5 is a flowchart diagram of more detailed operations for printing and/or rendering hyperlink destinations with content, in accordance with an embodiment.

FIG. 5 is a flowchart diagram of more detailed operations for printing and/or rendering hyperlink destinations with content, in accordance with an embodiment. Starting at 402, a check is made as to whether a link index table is included within the content. In general, a link index table is a table that stores hyperlink destinations. The link index table may also store indexes that point to or identify the hyperlink sources that are associated with the hyperlink destinations. Contents, such as electronic documents, can include link index tables. If a link index table is included within the content, then the hyperlink destinations stored in the link index table are extracted at 404.

On the other hand, the content may not include a link index table. With such content, the content is parsed for hyperlink destinations at 406. A parsing operation includes the search for hyperlink destinations within the content. A parsing operation can also include the search for hyperlink destinations and associated hyperlink sources. To search for hyperlink destinations, each data associated with the content is compared with one or more patterns that identify the data to be a hyperlink destination or hyperlink source. For example, the data "<a href="http://www.adobe.com">adobe</a>" within a HyperText Markup Language (HTML) electronic document can be parsed. The "href" identifies the data following the "href" to be the hyperlink destination. Following the hyperlink destination is the hyperlink source. As such, the data may be parsed to locate a hyperlink destination "http://www.adobe.com" and its associated hyperlink source "adobe." It should be noted that the content may be parsed from the start of the content to the end of the content. With the hyperlink destinations located, the hyperlink destinations are retrieved at 408.

After the hyperlink destinations are retrieved, the hyperlink destinations are printed and/or rendered with the content at 410. The hyperlink destinations may be rendered with the content such as to simulate a printed output. To print the hyperlink destinations, the hyperlink destinations (and the content) are outputted or transmitted to a printer. The printer is configured to print the hyperlink destinations with the content.

Figure 6:
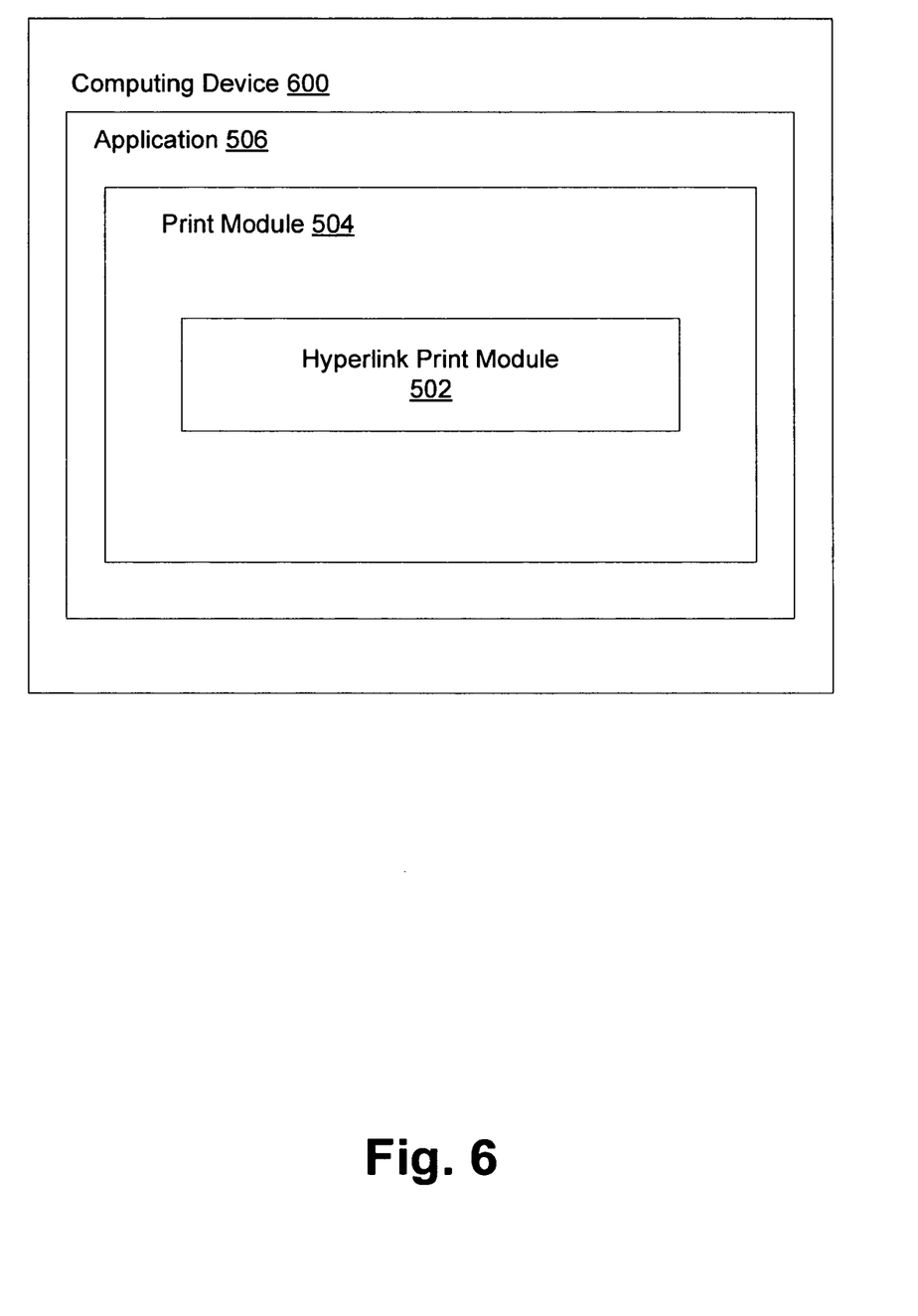
FIG. 6 is a simplified block diagram of an example of a program application for printing or rendering hyperlink destinations with content, in accordance with an embodiment.

FIG. 6 is a simplified block diagram of an example of a program application for printing or rendering hyperlink destinations with content, in accordance with an embodiment. As shown in FIG. 6, application 506 may be hosted on computing device 600. Application 506 may include a variety of program applications. For example, application 506 may be an operating system that manages the hardware and software resources on computing device 600. In other examples, application 506 may be a word processing application, a document viewer, or a Web browser. Application 506 may include print module 504. Print module 504 is configured to interface application 506 with a printer (not shown) in communication with computing device 600. In general, application 506 submits a print job to print module 504. Print module 504 is configured to connect to a printer using an appropriate protocol and to send the print job for queuing and printing.

In an embodiment, print module 504 can include hyperlink print module 502. Hyperlink print module 502 can be configured to extract hyperlink destinations from content and print the hyperlink destinations with the content. When a print job is submitted, for example, a user may be prompted with an option to print or render one or more hyperlink destinations when a hyperlink source is found. Alternatively, the hyperlink destinations may be automatically extracted and printed or rendered with content. In another example, hyperlink print module 502 may provide a dialog box (or other graphical user interfaces) that provides one or more options that allow a user to choose whether the hyperlink destinations are to be printed or rendered with the content.

Figure 7:
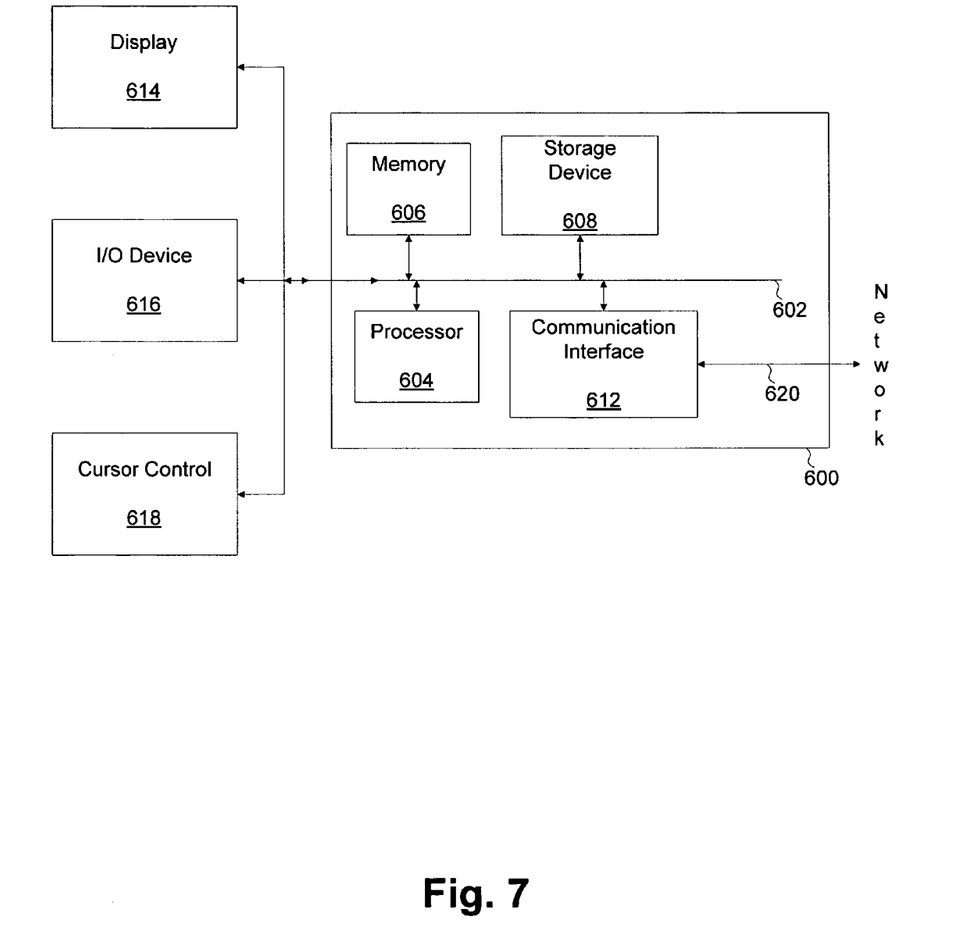
FIG. 7 is a simplified block diagram of an example of a computing device that is suitable for printing or rendering hyperlink destinations with content, in accordance with an embodiment.

FIG. 7 is a simplified block diagram of an example of a computing device that is suitable for printing or rendering hyperlink destinations with content, in accordance with an embodiment. In some embodiments, computing device 600 may be used to implement computer programs, logic, applications, methods, processes, or other software to print or render hyperlink destinations with content. Examples of computing device 600 includes a desktop computer, a server, a portable computing device, a personal digital assistant, a computational engine within an appliance, and other computing devices. As shown in FIG. 7, computing device 600 includes bus 602 or other communication mechanism for communicating information, which interconnects subsystems and devices, such as processor 604, system memory 606 (e.g., random access memory (RAM)), storage device 608 (e.g., read only memory (ROM), magnetic disk drives, optical disk drives, and other storage devices), communication interface 612 (e.g., modem or Ethernet card), display 614 (e.g., cathode ray tube (CRT) or liquid crystal display (LCD)), input/output device 616 (e.g., keyboard), and cursor control 618 (e.g., mouse or trackball).

In some embodiments, computing device 600 performs specific operations by processor 604 when executing one or more sequences of one or more program instructions stored in system memory 606. Such program instructions may be read into system memory 606 from another computer readable medium, such as storage device 608. In some embodiments, hard-wired circuitry may be used in place of or in combination with software program instructions to implement embodiments of the invention.

It should be appreciated that the term "computer readable medium" refers to suitable medium that participates in providing program instructions to processor 604 for execution. Such a medium may take many forms, including but not limited to, non-volatile media, volatile media, and transmission media. Non-volatile media may include, for example, optical or magnetic disks, such as storage device 608. Volatile media may include dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications. Common forms of computer readable media include, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computing device 600. In other embodiments, two or more computing devices, such as computing device 600, coupled by communication link 620 (e.g., local area network (LAN), public switched telephone network (PSTN), wireless network, and other communication links) may perform the sequence of program instructions to practice the embodiments in coordination with one another. In addition, computing device 600 may transmit and receive messages, data, and instructions, including program, i.e., application code, through communication link 620 and communication interface 612. Received program instructions may be executed by processor 604 as the program instructions are received, and/or stored in storage device 608, or other non-volatile storage for later execution.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:
1. A method, comprising:
receiving an electronic document comprising:

content to be displayed in a rendering of the electronic document;
a resource link configured to be displayed in the rendering of the electronic document; and
a resource location configured to not be displayed in the rendering of the electronic document, wherein the resource location is embedded in the resource link such that activation of the resource link is configured to generate access to a resource located at the resource location;
determining whether the electronic document comprises a link index table;
extracting the resource location from the electronic document,
wherein said extracting comprises extracting the resource location from within the link index table if said determining determines that the electronic document comprises the link index table, and
wherein said extracting comprises parsing the electronic document to identify the resource location if said determining determines that the electronic document does not comprise the link index table; and
providing a modified electronic document, wherein rendering the modified electronic document comprises a visual display comprising:
a visual display of at least a portion of the content; and
a visual display of the resource location.

2. The method of claim 1, further comprising:
generating a marker;
associating the marker with the resource link and the resource location; and
wherein said visual display further comprises a rendering of the marker in association with the resource link and the resource location, the marker being configured to identify that the resource location corresponds to the resource link.

3. The method of claim 1, wherein said rendering a visual display of the modified electronic document comprises outputting the modified electronic document to a printer for printing of the modified electronic document or to a graphical user interface for generating a visual display of the modified electronic document.

4. The method of claim 1, wherein the resource location is a Uniform Resource Locator.

5. The method of claim 1, wherein the resource link comprises an area of the content associated with the resource location.

6. The method of claim 1, wherein the resource link is an image.

7. The method of claim 1, wherein the resource link comprises a hyperlink source, and wherein the resource location comprises a hyperlink destination.

8. A non-transitory computer readable storage medium comprising program instructions stored thereon, wherein the program instructions are executable by a computer device to perform:
determining whether an electronic document comprises a link index table comprising a resource link in association with a corresponding resource location,
wherein the electronic document comprises:
content to be displayed in a rendering of the electronic document;
a resource link configured to be displayed in the rendering of the electronic document; and
the resource location configured to not be displayed in the rendering of the electronic document, wherein the resource location is embedded in the resource link such that activation of the resource link is configured to generate access to a resource located at the resource location;
extracting the resource location from the electronic document,
wherein said extracting comprises extracting the resource location from within the link index table if said determining determines that the electronic document comprises the link index table, and
wherein said extracting comprises parsing the electronic document to identify the resource location if said determining determines that the electronic document does not comprise the link index table; and
providing a modified electronic document, wherein rendering the modified electronic document comprises a visual display, comprising:
a visual display of at least a portion of the content; and
a visual display of the resource location.

9. The non-transitory computer readable storage medium of claim 8, further comprising computer instructions for:
generating a marker;
associating the marker with the resource link and the resource location; and
wherein said visual display further comprises a rendering of the marker in association with the resource link and the resource location, the marker being configured to identify that the resource location corresponds to the resource link.

10. The computer readable storage medium of claim 8, wherein said rendering a visual display of the modified electronic document comprises outputting the modified electronic document to a printer for printing of the modified electronic document or to a graphical user interface for generating a visual display of the modified electronic document.

11. The non-transitory computer readable storage medium of claim 8, wherein the resource location is a Uniform Resource Locator.

12. The non-transitory computer readable storage medium of claim 8, wherein the resource link comprises a word in the electronic document.

13. The non-transitory computer readable storage medium of claim 8, wherein the resource link comprises a hyperlink source, and wherein the resource location comprises a hyperlink destination.

14. A computing device, comprising:
a processor; and
a memory storing program instructions that when executed by the processor performs:
determining whether an electronic document comprises a link index table,
wherein the electronic document comprises:
content to be displayed in a rendering of the electronic document;
a resource link configured to be displayed in the rendering of the electronic document; and
the resource location configured to not be displayed in the rendering of the electronic document, wherein the resource location is embedded in the resource link such that activation of the resource link is configured to generate access to a resource located at the resource location;
extracting the resource location from the electronic document,
wherein said extracting comprises extracting the resource location from within the link index table if said determining determines that the electronic document comprises the link index table, and wherein said extracting comprises parsing the electronic document to identify the resource location if said determining determines that the electronic document does not comprise the link index table; and providing a modified electronic document, wherein rendering the modified electronic document comprises a visual display, comprising:
   a visual display of at least a portion of the content; and
   a visual display of the resource location.

15. The computing device of claim 14, wherein the processor is further configured to:
   generate a marker;
   associate the marker with the resource link and the resource location; and
   wherein said visual display further comprises a rendering of the marker in association with the resource link and the resource location, the marker being configured to identify that the resource location corresponds to the resource link.

16. The computing device of claim 15, wherein the resource location is displayed at the end of the electronic document.

17. The computing device of claim 14, wherein said rendering a visual display of the modified electronic document comprises outputting the modified electronic document to a printer for printing of the modified electronic document or to a graphical user interface for generating a visual display of the modified electronic document.

18. The computing device of claim 14, wherein the resource location is a Uniform Resource Locator.

19. The computing device of claim 14, wherein the resource link comprises a hyperlink source, and wherein the resource location comprises a hyperlink destination.

20. A method, comprising:
   receiving an electronic document comprising:
      content to be displayed in a rendering of the electronic document;
      a resource link configured to be displayed in a rendering of the electronic document; and
      the resource location, wherein the resource location is configured to not be displayed in the rendering of the electronic document, and wherein the resource location is embedded in the resource link such that activation of the resource link is configured to generate access to a resource located at the resource location; the link index table comprising the resource link stored in association with the resource location;
   determining whether the electronic document comprises a link index table;
   extracting the resource location from the electronic document,
      wherein said extracting comprises extracting the resource location from within the link index table if said determining determines that the electronic document comprises the link index table, and
      wherein said extracting comprises parsing the electronic document to identify the resource location if said determining determines that the electronic document does not comprise the link index table; and
   printing at least a portion of the electronic document,
      wherein a printout generated from said printing comprises:
         at least a portion of the content configured to be displayed in a rendering of the electronic document; and
         the resource location extracted.

21. The method of claim 20, further comprising displaying the rendering on a graphical user interface, wherein displaying the rendering comprises displaying the at least a portion of the content and the resource location in the same document.

22. The method of claim 20, wherein said printing the portion of the electronic document comprises printing the portion of the content and the resource location in the same document.

23. The method of claim 20, wherein the printout comprises the resource location printed adjacent to a location where the resource link is printed.

24. The method of claim 20, wherein the printout comprises the resource link printed within the portion of the content displayed, and the resource location is printed separate from the portion of the content comprising the resource link.

25. The method of claim 20, wherein the resource link comprises a hyperlink source, and wherein the resource location comprises a hyperlink destination.

* * * * *